United States Patent [19]
Goodman

[11] 3,757,944
[45] Sept. 11, 1973

[54] OPTICAL VERIFICATION DEVICE

[76] Inventor: Allan C. Goodman, 6431 Lake Apapka, San Diego, Calif.

[22] Filed: Jan. 15, 1971

[21] Appl. No.: 106,828

[52] U.S. Cl. ..... 209/111.7, 235/61.12 R, 250/219 Q
[51] Int. Cl. .......................................... B07c 5/342
[58] Field of Search ...................... 209/80.5, 111.7; 235/61.12 R, 61.12 N; 250/219 TD, 219 Q

[56] References Cited
UNITED STATES PATENTS

| | | | |
|---|---|---|---|
| 3,034,643 | 5/1962 | Keller | 209/111.7 X |
| 3,515,886 | 6/1970 | Thompson | 250/219 D |
| 3,519,832 | 7/1970 | Castaldi | 250/219 D |

Primary Examiner—Richard A. Schacher
Attorney—John R. Duncan

[57] ABSTRACT

An optical device useful in selecting and verifying the position of projection slides, slide magazines, etc., is disclosed. The verification device includes a mounting strip adapted to be removably attached to the edge of a projection slide, a slide magazine end panel, etc. A number of reflective elements are secured to the strip by frangible webs along a line. Selected elements may be easily broken away to provide a coded array of reflective and non-reflective elemental areas. A sensing means including a light source and photodetector past which a group of the coded devices is passed can select a slide, or verify the presence of a desired slide, according to the coded pattern of reflecting and non-reflecting elemental areas.

9 Claims, 9 Drawing Figures

INVENTOR.
ALLAN C. GOODMAN
BY
ATTORNEY

Patented Sept. 11, 1973 3,757,944

INVENTOR.
ALLAN C. GOODMAN
BY
*John R. Duman*
ATTORNEY

OPTICAL VERIFICATION DEVICE

BACKGROUND OF THE INVENTION

Slides bearing partially transparent images for viewing by optical projection are widely used, both for direct viewing and for projection onto photosensitive surfaces for copying purposes. Generally, the slides include an image-bearing film mounted in a relatively rigid frame. Preferably, the slides are adapted to be held in a magazine, from which individual slides may be removed for use whenever desired.

Recently, a computer-output-microfilm recorders have been developed in which alphanumeric or graphical data presented on the face of a cathode ray tube is photographed to produce microimages. This equipment operates at high speed and provides computer generated information in a convenient, easily handled and stored, arrangement. Often, it is desired to print the text on microfilm in a format which includes a background form, such as columnar lines with column headings. Forms projectors have been developed permitting simultaneous exposure of the film to data on the cathode ray tube face and to a form image projected from a form slide.

To eliminate the necessity of manually changing forms slides, an automatic slide changing system has been developed. This system is described in detail and claimed in copending U.S. Pat. application Ser. No. 106,829 filed concurrently herewith. In this system slides, selected electronically, are moved from a magazine to a projection station. Slides used in computer output microfilming equipment are relatively large and heavy. The form transparency can be removed from the slide frame and replaced with a new transparency, permitting reuse of the relatively expensive frame. Thus, it is necessary that any identifying indicia or coding of the frame be replaceable when the transparency is changed.

In forms slide use, as well as others, it may be desirable to select slides in sequence other than in seriatim. Most systems permitting such selection require coded placement of slides in the magazine, and are incapable of detecting misplacement. While some coding techniques permitting random placement of slides in a magazine, such as described in U.S. Pat. No. 3,034,643, these systems are often inaccurate and coding is difficult. Further, it is difficult to recode a miscoded slide, or to change the code when the transparency mounted in the slide is changed.

Where the coding is provided by a pattern of reflective spots directly applied to the edge of the slide, errors in detection are likely, since the photodetector must distinguish between the reflective spot and the partially reflective (often, white cardboard) between the reflective spots. Applying the coded spots by a manual painting operation, or applying a non-reflective coating over areas on a reflective strip is cumbersome and leads to errors in coding. These known edge coating systems are suitable only for slides of a single size, and are unsuited to the coding of slide magazines, etc.

Thus, there is a continuing need for improved optical verification and selection devices, especially for use in verifying and selecting forms slides and magazines in computer-output-microfilming equipment.

SUMMARY OF THE INVENTION

It is, therefore, an object of this invention to provide an optical verification device and verification system overcoming the above-noted problems.

Another object of this invention is to provide an improved system for selecting and verifying the position of desired slides in a randomly filled magazine.

Still another object of this invention is to provide an optical verification device providing simple, convenient coding.

Yet another object of this invention is to provide an easily replaceable optical verification device for optically selected items.

The above objects, and others, are accomplished in accordance with this invention by an optical verification piece which comprises a mounting strip adapted to be removably attached to the edges of projection slides, slide magazines, etc. A plurality of closely spaced reflective elements are mounted on the strip in a linear, substantially planar, array. The reflective elements are visible from a viewpoint outside the slide, in approximately the plane of the slide. Each reflective element is secured to the mounting strip by means of a frangible web. The strip is coded by breaking away selected reflective elements, leaving a pattern of reflective and non-reflective elemental areas along the array.

A detector comprising at least one light source and a photoelectric detector for each reflective element is moved relative to the verification devices attached to a stack of slides or other items. Light will either be reflected or not from each elemental area to the corresponding detector. Using conventional logic circuits, the detector will scan successive verification devices until the one having the desired pattern of reflective and non-reflective elemental areas is reached, whereupon the slide changer or other operating means will be actuated.

The verification device is preferably constructed of a relatively rigid but flexible plastic material, such as an acrylic resin, which will permit the verification device and the host item to be "snapped" together.

The reflective elements may be made reflective in any suitable manner. Preferably, a thin, highly reflective layer, such as aluminum is applied, such as by vacuum evaporation, over the removable reflective elements. Often, merely providing the reflective elements with a smooth, shiny plastic surface will be sufficient, since as discussed below, no reflection can occur when reflective element has been removed, and the photoelectric detector can distinguish between slight reflection from the plastic surface and no reflection when the surface is removed.

BRIEF DESCRIPTION OF THE DRAWING

Details of the invention, and of a preferred embodiment thereof, will be further understood upon reference to the drawing, wherein:

FIG. 6 is a vertical section through the device taken on line 6—6 in FIG. 5;

DETAILED DESCRIPTION OF THE INVENTION

Figure 1:
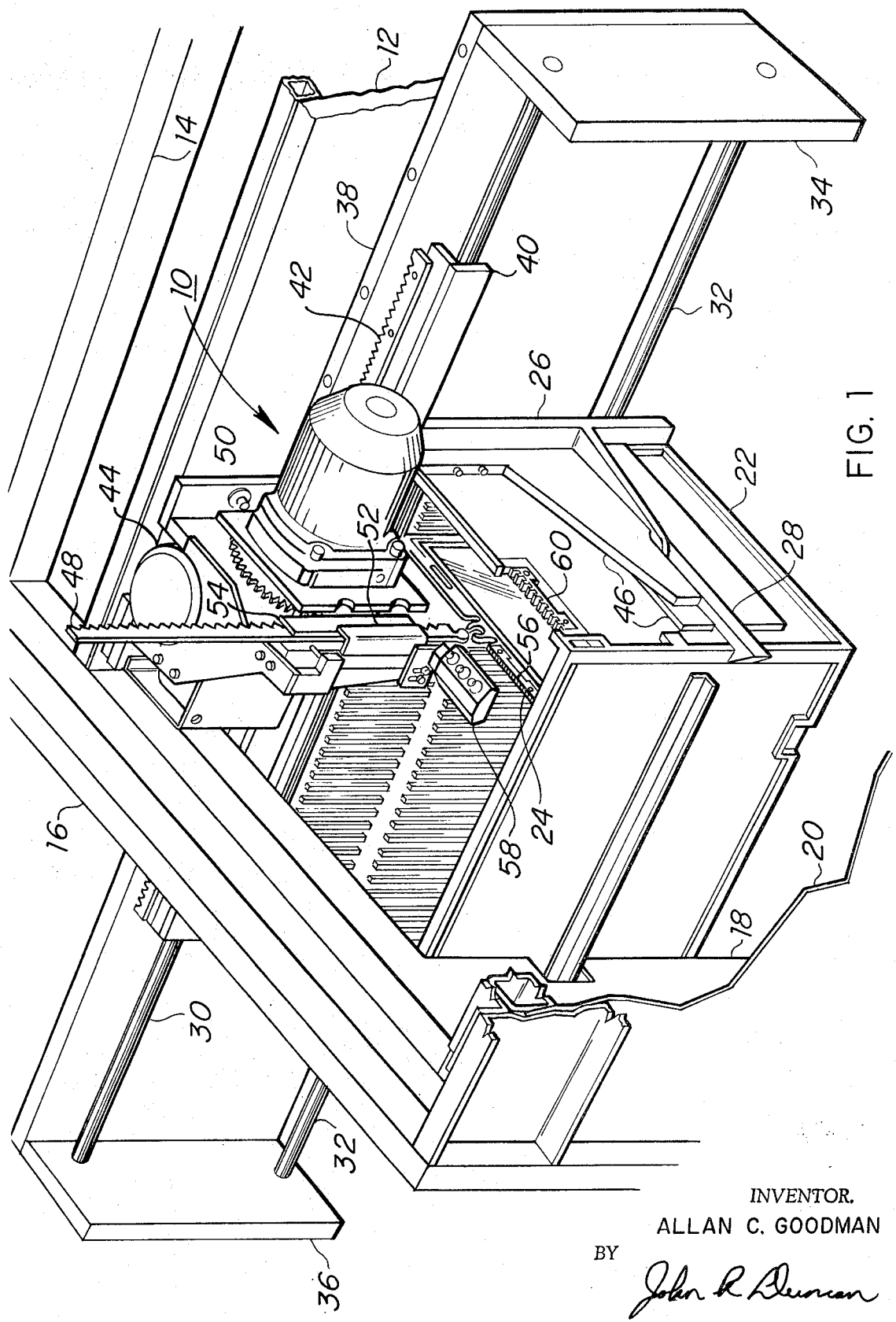
FIG. 1 is an isometric view of a slide handling system using the verification device of this invention.

Referring now to FIG. 1 there is seen a slide handling system which permits any one of a plurality of slides mounted in a magazine to be selected and moved to a projection station for use. A computer-output-microfilm recorder optical system with which this preferred embodiment may be used is described in detail in copending U.S. Pat. application No. 106,829, filed concurrently herewith.

The slide changer generally designated 10 is mounted on vertical plate 12 which also serves as a support for the optical system (not shown) located below slide changer 10. Plate 11 is mounted on the main equipment frame 14. Frame 14 supports an end enclosure 16 which has an opening 18 through which slide changer 10 projects. A panel 20 closes the front of the equipment.

A magazine 22, adapted to hold a plurality of slides 24, is held in contact with plate 26 by spring clips 28 at each end of magazine 22. Plate 26 is fastened to upper and lower guide sleeves (not shown) which slidably engage upper and lower guide shafts 30 and 32. The ends of shafts 30 and 32 are secured to inner and outer mounting plates 34 and 36 which are in turn secured to plate 38 which is supported against main plate 12. Rack support member 40 is secured to plate 26 and the upper guide sleeve. Rack 42 is mounted on member 40 and meshes with a pinion gear (not shown) driven by reversible motor 44. When motor 44 is activated, the pinion gear drives rack 42 back and forth parallel to shafts 30 and 32.

Magazine 22 may be removed and replaced by moving the magazine and support plate 26 toward end plate 36 until the magazine clears end enclosure 16, then moving spring clips 28 out of engagement with the magazine. Magazine 22 may then be removed. Cooperating grooves and lands between the ends of magazine 22 and the inner surfaces of frame members 46 may be provided to aid in supporting the magazine and in guiding it into and out of the mounted position.

While a generally rectangular slide magazine is shown in FIG. 1 is preferred, magazines having other configurations, such as "wheel"-like magazines, may be used if desired.

Magazine 22 ordinarily holds a plurality of slides 24 in a substantially parallel array. However, only a single slide is shown in FIG. 1, for clarity. Each slide 24 is held in position by frictional engagement with grooves in the inner walls of magazine 22. This permits the slides to be pushed downwardly out of magazine 22 into a projection station (not shown) below the magazine.

In use, a slide to be projected is located immediately below slide drive rack bar 48 by operating motor 44 to move magazine 22. The rack on rack bar 48 engages a pinion 50 gear which is rotated by motor 30 to drive rack bar 48 upwardly or downwardly, as desired. Guide members 52 and 54 support rack bar 48 for vertical movement.

Figure 4:
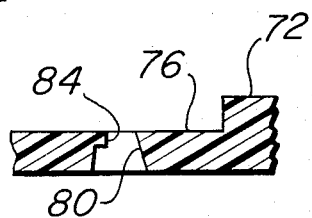
FIG. 4 is a horizontal section through a portion of the mounting means taken on line 4—4 in FIG. 2.
Figure 5:
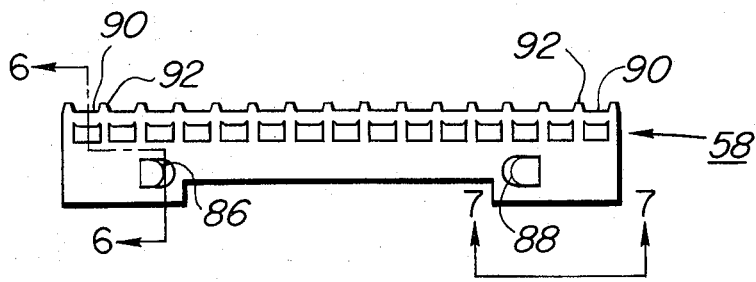
FIG. 5 is an elevation view of a preferred verification device.

To aid in selecting the desired slide 24, a coded verification device 56 is provided along one top edge of each slide. As shown in greater detail in FIG. 3, verification device 56 has a series of closely spaced reflective or non-reflective elemental areas along its length. Binary coding is accomplished by arranging the linear pattern of reflecting and non-reflecting elemental areas. A verification reader 58 is mounted on guide member 52, just above slides 24. As best seen in FIGS. 4 and 5, reader 58 contains a series of juxtaposed light sources and photoelectric detectors. The detectors are activated by reflected light only. Thus, as magazine 22 is moved longitudinally below reader 58, which senses the varying patterns of reflecting areas. When reader 58 senses the code corresponding to the desired slide, conventional control circuitry causes magazine 22 to stop with the desired slide immediately below rack bar 48. A verification device 60, basically similar to slide verification devices 56, may be mounted in the upper edge of magazine 22. Then, when a new magazine is inserted into slide changer 10, reader 58 may be caused to scan magazine verification device 60 to verify that the correct magazine has been selected and inserted.

Figure 2:
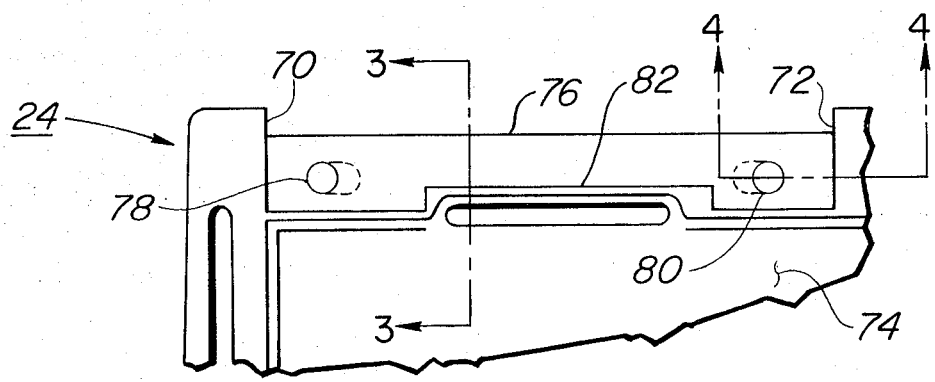
FIG. 2 is an elevation view of a portion of a slide frame showing the verification device mounting means.

A mounting means for replaceably holding the verification devices along the edge of a slide frame, magazine end piece, etc., is illustrated in FIG. 2. The mounting means is here illustrated in the context of the slide frame 24. A cut-away area is provided along the upper edge of frame 24, bounded by end walls 70 and 72. The transparency holding area 74 is within the frame. A support member 76 spans the distance between end walls 70 and 72. Member 76 is thinner than the main part of the slide frame beyond end walls 70 and 72, and contains two mounting holes 78 and 80 into which mounting lugs on the verification device are snapped.

Figure 3:
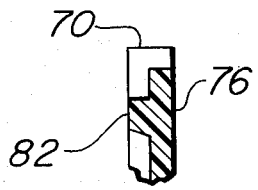
FIG. 3 is a vertical section through the mounting means taken on line 3—3 in FIG. 2.

As seen in FIG. 3, an upstanding frame portion 82 having the same thickness as the main slide frame is provided between mounting holes 78 and 80 to aid in supporting the verification device. Means may be provided in the area of portion 82 to hold a slide cover sheet in position, if desired.

Mounting holes 78 and 80 have a generally circular opening in the surface of member 76 which engages verification device 56. As seen in FIG. 4, these holes have an elongated, generally oval or elliptical, opening in the opposite surface. The hole cross section varies between the two surfaces, with a step at 84. Step 84 provides a flexible edge, beyond which the verification device mounting lugs 86 and 88 are snapped to releasably latch the device in place, while permitting removal and replacement of the device.

A preferred embodiment of the verification device is shown in FIG. 5. Verification device 56 includes a plurality of closely spaced elemental reflecting areas 90. Reflective elements 90 all lie substantially in one plane, along the line of the slide frame edge. While it is preferred that the surface plane of elements 90 be approximately perpendicular to the plane of the slide frame, they may lie at some other angle so long as they are easily visible when a number of slides are stacked together. Each reflective element 90 is secured to the body of the device by an easily frangible web, so that they can be easily broken away. Elements 90 may be removed by grasping them with the tips of thin-nosed pliers and twisting to fracture the narrow junction between elements 90 and walls 92.

The upper surfaces of elements 90 are preferably highly light reflecting. Typically, a thin aluminum layer may be applied by vacuum evaporation, or a thin layer of reflective paint may be applied. For convenience of coating, the entire upper surface of the device may be coated, including walls 92, without problems.

Figure 7:
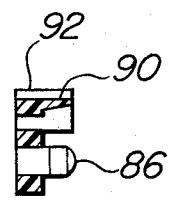
FIG. 7 is a view of a portion of the device, taken from the position indicated by line 7—7 in FIG. 5.

As best seen in FIGS. 6 and 7, upstanding legs 86 and 88 have an enlarged head which snaps behind step 84 in support member 76 to hold verification device 58 in place. The lug arrangement permits convenient installation and replacement of the verification device. The lower surface of the verification device conforms to the shape of the cut-out in the slide frame, including support 82, to assure a snug fit.

Figures 8, 9:
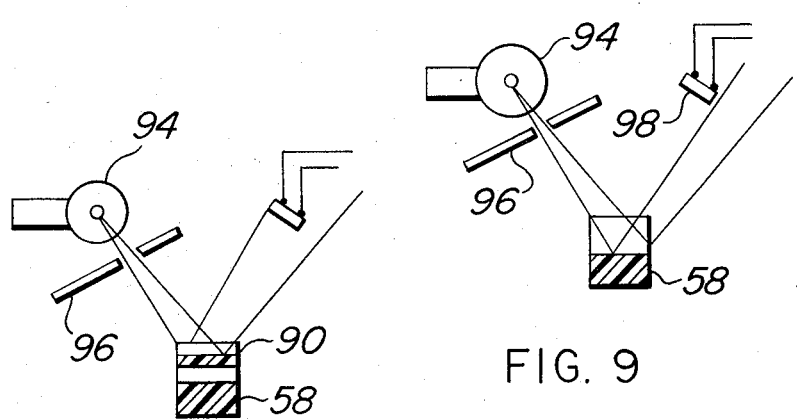
FIGS. 8 and 9 are schematic transverse sections through a verification device showing operation with the reflecting element in place and broken away, respectively.

FIGS. 8 and 9 schematically illustrate the operation of the verification device. FIG. 8 is a vertical section in elevation through the verification device and reader, with the reflective element 90 in place. Light from a source 94 passes through an aperture in aperture plate 96, and is reflected to a photodetector 98. When the reflective element 90 is broken away, as illustrated in FIG. 9, light from source 94 strikes the base of verification device 58. This surface is much less reflective than is the surface of reflective element 90. However, some light will be reflected. Because the reflecting surface is spaced further away, reflected light misses photodetector 98. Thus, the detector can distinguish the presence or absence of reflective elements 90 with little chance of error.

Light source 94 may comprise one long source adjacent the row of reflective elements 90, or may be a series of small sources. One photodetector 98 is positioned adjacent to each reflective element position. Thus, the photodetector array can pass a binary coded signal to the system controller corresponding to the pattern of reflective and non-reflective elemental areas along verification piece 58. This signal when compared with the pattern corresponding to the desired slide will verify whether or not the desired slide is in position adjacent to the verification reader.

Although specific components, arrangements and proportions are described in the above description of a preferred embodiment, these may be varied as discussed above with similar results. Other modifications, applications, and ramifications of the present invention will occur to those skilled in the art upon reading this disclosure. These are intended to be included within the scope of this invention, as defined in the appended claims.

I claim:
1. An optical verification device which comprises:
 a. a mounting strip adapted for attachment to items to be automatically selected;
 b. said mounting strip including latching means for releasably securing said strip to said item;
 c. a plurality of reflective elements mounted in a linear closely spaced array on said strip with their reflective surfaces lying substantially in the same plane;
 d. each reflective elemented mounted on said strip by an easily frangible web, whereby selected reflective elements may be easily removed to produce an array of coded reflective and non- reflective areas.
2. The device according to claim 1 wherein at least said reflective surfaces are coated with a thin, highly reflective layer of aluminum.
3. The device according to claim 1 wherein said mounting strip latching means includes at least one projecting lug adapted to engage a corresponding hole in said item to releasably secure said strip to said item.
4. In a slide verification system which includes a plurality of adjacent projection slides, a verification area along the edge of each slide having a coded linear array of reflective and non-reflective elemental areas, and a detector movable relative to said verification area which comprises a light source directing light against said verification areas and a plurality of photo-electric detectors to detect the reflection or non-reflection of light from each of said elemental areas; the improvement wherein said verification area comprises a mounting strip removably attached to said slide edge by a releasable latch means, a plurality of reflective elements mounted on said strip in a linear closely spaced array substantially parallel to said slide edge; each reflective element being connected to said strip by an easily frangible web, whereby selected reflective elements may be easily removed to produce the desired coded array of reflective and non-reflective elemental areas.
5. The improvement according to claim 4 wherein at least the surface of said reflective elements are coated with a thin highly reflective layer of aluminum.
6. The improvement according to claim 4 wherein said latch means includes at least one projecting lug on said strip each lug having an enlarged head adapted to releasably engage a corresponding hole in said slide edge.
7. A projection slide comprising:
 a. a unitary substantially planar slide including a slide frame surrounding a transparent film support sheet;
 b. means to hold a film transparency in contact with said support sheet;
 c. interlocking means for releasably attaching a verification device to said slide frame along one outer edge thereof;
 d. said verification device including a mounting strip holding a plurality of reflective elements in a linear closely spaced array, the reflective surfaces lying substantially in a single plane and visible from a viewpoint outside said frame substantially in the plane of said frame.
 e. each of said reflective elements being connected to said strip by an easily frangible web, whereby selected reflective elements may be easily removed to produce a desired coded array of reflective and non-reflective elemental areas.
8. The slide according to claim 7 wherein the plane of said reflective surfaces is substantially perpendicular to the plane of said slide and at least said reflective surfaces are coated with a thin highly reflective aluminum layer.
9. The slide according to claim 7 wherein said interlocking means includes a plurality of lugs extending outwardly from said strip, each of said lugs having an enlarged head, each lug adapted to releasably latch within a corresponding hole in said slide frame edge.

* * * * *